June 20, 1944.  G. V. PALMROSE  2,351,780
METHOD OF ABSORBING SULPHUR DIOXIDE
Filed April 1, 1941
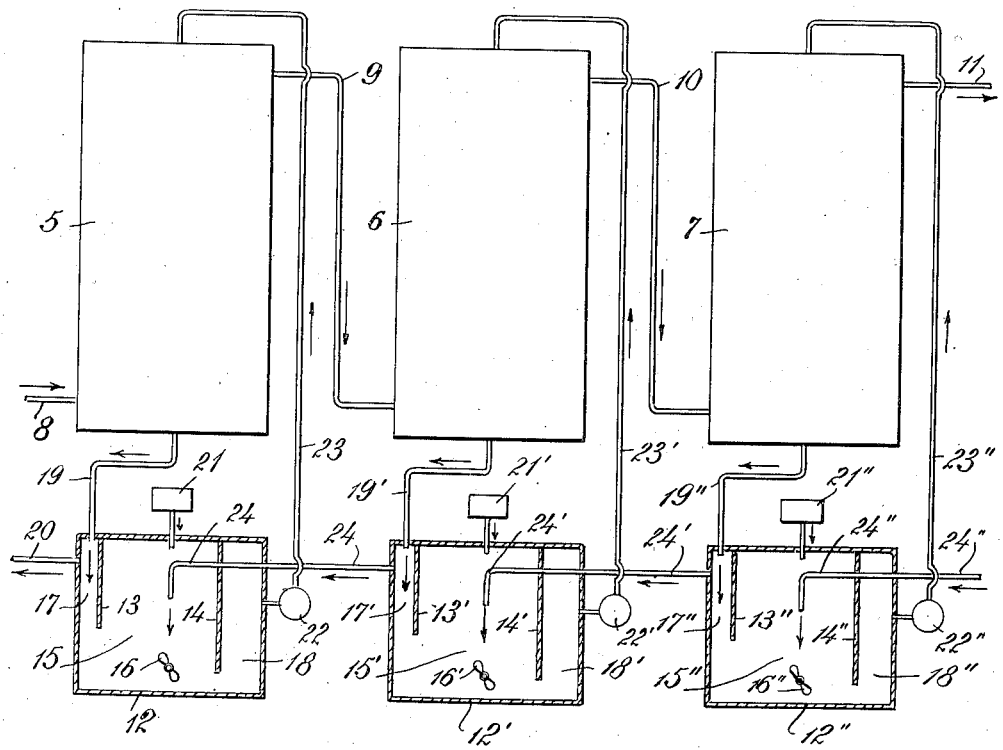
INVENTOR
George Victor Palmrose
BY
ATTORNEYS Patented June 20, 1944

2,351,780

UNITED STATES PATENT OFFICE 2,351,780

METHOD OF ABSORBING SULPHUR DIOXIDE

George Victor Palmrose, Longview, Wash., assignor to Weyerhaeuser Timber Company, Tacoma, Wash., a corporation of Washington Application April 1, 1941, Serial No. 386,254

10 Claims. (Cl. 23—130)

This invention relates to the absorption of sulphur dioxide from weak furnace gases, and more particularly to the preparation of magnesium bisulphite solutions adapted for use in the so-called sulphite process for the production of cellulose. The invention is especially valuable in a cyclic process in which magnesium is used as the base and the concentrated waste liquor is burned in a furnace to regenerate the magnesium as the oxide, the organic and other sulphur compounds being converted into sulphur dioxide, which is recombined with the magnesium oxide to provide fresh magnesium bisulphite liquor.

In such a process, it is desirable to use a slurry of magnesium oxide and water as the absorbing medium, and since the monosulphite of magnesium is only sparingly soluble, the absorption must be so conducted as to produce a solution of magnesium bisulphite. Furthermore, since in any cyclic recovery process it is desirable for the sake of heat economy to keep the waste liquor at a high concentration of solids, and since this is best accomplished by reducing the amount of liquor in the digester, it is necessary to produce, by absorption, a relatively high concentration of bisulphite in the resulting liquor.

In speaking of these solutions, I employ the convention of the sulphite cellulose industry in which the sulphur dioxide content of the solution is referred to as "total $SO_2$"; the sulphur dioxide combined with the base to form monosulphite is called "combined $SO_2$" and is theoretically equal to the sulphur dioxide present having no ionizable hydrogen. The "free $SO_2$" is that potentially possessing two ionizable hydrogens. The sum of the combined and free $SO_2$ is equal to the total $SO_2$. To make this clearer, if we titrate a solution of magnesium bisulphite $Mg(HSO_3)_2$ with a standard solution of caustic soda using phenolphthalein as an indicator, the $SO_2$ equivalent of NaOH consumed represents one-half of the original $SO_2$ present in the solution. This latter figure is called the "free $SO_2$," and the total $SO_2$ minus the free $SO_2$ represents the so-called "combined $SO_2$" or the $SO_2$ theoretically existing as $MgSO_3$.

As already indicated, magnesium monosulphite is only sparingly soluble in water (0.62% $MgSO_3$ at 20° C.). The bisulphite is very soluble. For example, I have prepared a solution of this salt containing 285.6 grams of $SO_2$ per liter, and the limit of solubility was not reached. When concentrated solutions of the bisulphite are allowed to evaporate, free sulphur dioxide comes off, and the monosulphite of magnesium is precipitated. As the result of these facts, the recovery of sulphur dioxide by absorption in water containing magnesium oxide presents a very different problem from that arising where an alkali metal or ammonia is used as a base, because the monosulphites of these bases are soluble in water. The difficulty is particularly accentuated where the sulphur dioxide in the gases is at the relatively low concentration of approximately 1%, as it is when concentrated waste liquor is burned to recover magnesium oxide and sulphur dioxide.

It is the object of the present invention to afford a satisfactory and commercially practicable method of absorbing sulphur dioxide from weak furnace gases and forming a concentrated magnesium bisulphite liquor suitable for use in digesting cellulose material.

Another object of the invention is the provision of a method in which the gases containing sulphur dioxide are subjected successively to absorption as the concentration decreases, until substantially all of the sulphur dioxide has been recovered, while the resulting solution is advanced through the system, becoming increasingly concentrated in magnesium bisulphite until it is finally withdrawn as a suitably concentrated solution adapted for use in the digester.

Other objects and advantages of the invention will be apparent as it is better understood by reference to the accompanying drawing which is a diagrammatic representation of an apparatus adapted for the practice of the invention.

Before considering the apparatus and the procedure, it is necessary to have an idea of the limiting conditions which affect the operation.

I have already indicated that with bases producing soluble monosulphites no difficulty is encountered in attaining any desired composition in the absorbing solution. Where magnesium oxide is used as a base it is necessary to allow some time for the magnesium oxide to combine with $SO_2$ to form magnesium monosulphite and this magnesium monosulphite must be partially converted by further amounts of $SO_2$ into magnesium bisulphite which serves as a medium for dissolving a certain definite amount of magnesium monosulphite, the amount of such magnesium monosulphite which is dissolved depending, of course, on the temperature and concentration of the solution of magnesium bisulphite.

Magnesium monosulphite is sufficiently soluble in a solution of magnesium bisulphite to afford an effective absorption agent for sulphur dioxide. Thus by alternately introducing magnesium oxide to a solution containing absorbed sulphur dioxide and then absorbing additional sulphur dioxide in a part of the resulting saturated solution, I am able to gradually build up the concentration of the magnesium bisulphite to the desired point. This procedure affords the most efficient method of securing a strong liquor suitable for cooking cellulose materials.

In carrying out the invention, therefore, I provide a reaction zone of relatively large capacity, wherein a suitably agitated bisulphite solution containing sulphur dioxide may react with magnesium oxide to produce a saturated solution of magnesium sulphite in magnesium bisulphite. I also provide a settling zone in which unreacted magnesium oxide settles into the reaction zone. The clear, saturated solution is re-circulated through an absorption tower in which the clear, saturated solution is enriched in sulphur dioxide and is in part withdrawn and in part is delivered to the reaction zone for further treatment with magnesium oxide. In order that the absorption from the relatively weak furnace gases may be as efficient as possible, the absorption towers and the reaction and settling zones are multiplied, and the liquor, as it grows stronger, is circulated through the absorption towers successively while the gases carrying sulphur dioxide in successively reduced concentration pass through the system countercurrent to the direction of travel of the liquor.

Thus, the furnace gases will enter the first tower and, after contact with a portion of the strongest liquor, will pass successively through the remaining towers and come in contact with the liquor from their appurtenant reaction and settling zones, while a portion of the strong liquor is withdrawn from the collecting zone connected with the first tower, and water is introduced to the reaction zone related to the last tower. In this way, magnesium oxide is introduced at successive points to the several reaction zones and reacts with the liquor which has absorbed sulphur dioxide to produce eventually the strong liquor consisting of clear magnesium bisulphite which is required for the digestion of the cellulose material.

5, 6 and 7 represent towers of suitable material and size, each filled with grids or other elements designed to break up the flow of liquor and to effect the maximum surface contact between the liquor and the gases passing therethrough. Three towers are illustrated for convenience, but more or less may be employed, depending upon the desired efficiency of the absorption with respect to removal of the maximum amount of sulphur dioxide from the gases. The furnace gases of low concentration enter the tower 5 through a pipe 8 and pass through a pipe 9 to the tower 6, and thence through a pipe 10 to the tower 7. If only three towers are used, the waste gases are removed through a pipe 11.

Appurtenant to the tower 5 is a receptacle 12 having partitions 13 and 14 disposed therein to afford a reaction zone 15 in which the solution may be agitated by any suitable agitating device 16. The partitions 13 and 14 afford collecting and settling zones 17 and 18. The liquor descending from the tower 5 passes through a pipe 19 into the collecting zone 17 from which a portion is withdrawn as the strong liquor to be used for the digestion of pulp through a pipe 20. The balance of the liquor passes beneath the partition 13 into the reaction zone where it is agitated with a suitable quantity of magnesium oxide supplied in the dry state or as a slurry from the feeding device 21. The agitated liquor passes beneath the partition 14 and is withdrawn by a pump 22 and delivered through a pipe 23 to the top of the tower 5, through which it descends in contact with the entering gaseous mixture. Liquor overflowing from a corresponding receptacle 12' associated with the tower 6 is delivered through a pipe 24 to the agitating zone of the receptacle 12.

The receptacle 12' is provided with partitions 13' and 14', affording an agitating zone 15' in which an agitator 16' is disposed. Collecting and settling zones 17' and 18' are formed by the partitions 13' and 14', and liquor is delivered from the tower 6 through a pipe 19', a portion being withdrawn through the pipe 24 as previously indicated. The balance of the liquor passes into the reaction zone 15' to be mixed with magnesium oxide or a slurry thereof in water supplied through the feeding device 21'. A portion of the liquor passing beneath the partition 14' is withdrawn by a pump 22' and delivered by a pipe 23' to the top of the tower 6, through which it descends in contact with gases supplied through the pipe 9. Liquor from the preceding unit is delivered through a pipe 24' to the receptacle 12'.

A similar receptacle 12" is associated with the tower 7 and is provided with partitions 13" and 14" forming a reaction zone 15" in which an agitating device 16" is provided. The partitions afford collecting and settling zones 17" and 18". Liquor is supplied from the tower 7 through a pipe 19" to the collecting zone 17", and a portion is withdrawn through the pipe 24' as previously indicated. The balance of the liquor passes beneath the partition into the reaction zone 15" and is mixed with magnesium oxide or a slurry thereof in water supplied through a feeding device 21". The liquor passes beneath the partition 14" and is withdrawn by pump 22" and delivered through a pipe 23" to the top of the tower 7. Water may be supplied through a pipe 24" to the reaction zone 15" in volume equivalent to the amount of liquor withdrawn through the pipe 20.

As will be understood from the foregoing description, the liquor in each unit comprising the tower and the appurtenant receptacle with its collecting, reaction and settling zones is circulated continuously within the unit to absorb sulphur dioxide, the liquor being then caused to react with magnesium oxide. A portion of the clear liquor from each unit is recirculated in the unit, and the balance is delivered to the succeeding unit where the operation is repeated until a sufficiently concentrated liquor is obtained and withdrawn for use in the digestion of cellulose material.

The theory of the operation may now be considered. As an illustration, the furnace gas contains approximately 1% of sulphur dioxide by volume and arrives at the tower 5 at a temperature of 40° C. and at substantially atmospheric pressure. It may be assumed that the liquor produced is required to contain 5.00% combined $SO_2$ and to be as high in free $SO_2$ as may be economically feasible with a practical tower size.

The partial pressure of $SO_2$ in the entering gas will be 1% of 760 mm., or 7.6 mm. of mercury. Allowing a driving force of 1 mm., the partial pressure of the liquor leaving the tower 5 will be 6.6 mm. As the result of experimental investigation, I have found that this partial pressure of $SO_2$ over magnesium-mono-bisulphite mixtures permits the withdrawal from the tower of a liquor containing 4.7% free $SO_2$. The liquor leaving the system will contain 9.7% total $SO_2$, but no free $SO_2$ in excess of that occurring in the magnesium bisulphite.

A partial pressure difference of 1 mm. may be taken at the top of the tower 5 so that the gas leaving through the pipe 9 will have an $SO_2$ pressure of 3.85 mm. This will fix the absorption of gas in the tower 5 at 49.4%. The absorption may be fixed at any other percentage, depending on the cost of the tower and the power required for the circulating pump.

The operation of the tower 5 is carried on as follows. With the gas flowing into the tower through the pipe 8 and out through the pipe 9, the saturated solution enters the pump 22 from the settling zone 18 and is delivered through the pipe 23 to the top of the tower 5. The absorption solution is distributed over the absorption surface in the tower 5 and flows down, counter-current to the gas, and leaves the tower 5 through the pipe 19 and enters the zone 17 of the receptacle 12. Part of the solution leaves the system through the pipe 20. The other part enters the reaction zone 15, where it is mixed by the agitator 16 with the overflow solution from the receptacle 12' and magnesium oxide that is delivered from the feeding device 21. The magnesium oxide feed is adjusted so as to maintain 5% combined $SO_2$ solution at the suction of the pump 22. A continuous recording pH meter may be utilized to determine or control this composition. Any unreacted magnesium oxide settles from the solution before it enters the pump 22.

With the tower 5 absorbing 49.4% of the gas, the composition of the overflow solution in pipe 24 from the receptacle 12' will be 50.6% of the total in the pipe 20, or 4.91% total $SO_2$. Again allowing 1 mm. of mercury as the terminal driving force for absorption, the partial pressure of this solution will be 2.85 mm. of mercury $SO_2$ pressure, and the combined calculates to be 2.54% combined $SO_2$. The free $SO_2$ will be consequently 2.37%. The F–C ratio for the saturated solution at 40° C. near the above total is about 0.80. Therefore, the $SO_2$ content of the saturated solution will be 2.54% combined $SO_2$, and will be 2.03 free $SO_2$. Calculation shows the partial pressure of this solution to be 0.71 mm. Allowing a driving force of 1 mm., the size of the tower 2 may be calculated for 28.2% absorption as previously indicated. However, the proportion of absorption may be modified, depending on the cost of the tower and the power cost for circulating the liquor. The operation is the same as in tower 5, and need not be repeated in detail.

The gas entering the tower 7 will have a partial pressure of 1.71 mm., and allowing a driving force of 1.0 mm. at the bottom of the tower 7, the partial pressure of the solution leaving the tower 7 through pipe 19'' will be 0.71 mm. The composition of the solution will be substantially 2.10% total $SO_2$. Calculation shows this solution will have a combined content of 1.11% combined and a free content of 0.99%. The partial pressure of the saturated solution calculates to be 0.16 mm. Taking 0.1 mm. of driving force at the exit, the towers would give 96.6% absorption of the gas. A fourth tower, operated substantially as the rest, may be added to approach 100% absorption. The operation of the tower 7 is the same as the operation in the preceding towers, and need not be described in detail.

It may be shown by similar calculations that where only 4.00% combined $SO_2$ is required, three towers may be used to effect substantially 100% absorption. In general, I make the last tower function in a range to effect the final clean-up of the gas.

The advantages of my invention are apparent when it is considered that economical handling of dilute gases requires an absorption tower with low pressure drop. These towers require solution free from solids or tendency to crystallize. By arranging space for the reaction with magnesium oxide and by providing for settling of the solids, I avoid the difficulty which would arise if solids were permitted to enter the tower or to separate from the liquor therein. Moreover, by separating the solids before recirculation, abrasive action of magnesium oxide particles on the pumps, which would result in serious wear, is avoided.

By dividing the absorption into steps, progressively increasing the magnesium content in the solution, I obtain the absorption of the weak gas in a concentrated solution, despite the insolubility of magnesium monosulphite.

Various changes may be made in the details of the operation as well as in the structure of the apparatus used, without departing from the invention or sacrificing the advantages thereof.

I claim:

1. The method of producing magnesium bisulphite liquor by absorption of sulphur dioxide from gases containing a concentration of sulphur dioxide of the order of 1%, which comprises absorbing the sulphur dioxide in a clear liquor consisting of a water solution of magnesium monosulphite in magnesium bisulphite, under conditions such that the total amount of sulphur dioxide in the resulting solution is less than that required to combine with the total amount of magnesium present to form a true magnesium bisulphite solution, withdrawing a part of the resulting solution, dissolving magnesium oxide in the remainder of the solution and recirculating the clear solution for repeated absorption of sulphur dioxide.

2. The method of producing magnesium bisulphite liquor by absorption of sulphur dioxide from gases containing a concentration of sulphur dioxide of the order of 1%, which comprises absorbing the sulphur dioxide in a clear liquor consisting of a water solution of magnesium monosulphite in magnesium bisulphite, under conditions such that the total amount of sulphur dioxide in the resulting solution is less than that required to combine with the total amount of magnesium present to form a true magnesium bisulphite solution, withdrawing a part of the resulting solution, agitating the remainder of the solution with magnesium oxide, settling the undissolved magnesium oxide from the solution, and recirculating the clear solution for repeated absorption of sulphur dioxide.

3. The method of producing magnesium bisulphite liquor by absorption of sulphur dioxide from gases containing a concentration of sulphur dioxide of the order of 1%, which comprises absorbing the sulphur dioxide in a clear liquor consisting of a water solution of magnesium monosulphite in magnesium bisulphite, under conditions such that the total amount of sulphur dioxide in the resulting solution is less than that required to combine with the total amount of magnesium present to form a true magnesium bisulphite solution, withdrawing a part of the resulting solution, dissolving magnesium oxide in the remainder of the solution, recirculating the clear solution for repeated absorption of sulphur dioxide, repeating the operation successively with the withdrawn part of the solution and gas containing higher proportions of sulphur dioxide, but not substantially exceeding a concentration of 1%, until a liquor of the desired concentration is obtained, and finally withdrawing substantially continuously a portion of that liquor.

4. The method of producing magnesium bisulphite liquor by absorption of sulphur dioxide from gases containing a concentration of sulphur dioxide of the order of 1%, which comprises absorbing the sulphur dioxide in a clear liquor consisting of a water solution of magnesium monosulphite in magnesium bisulphite, under conditions such that the total amount of sulphur dioxide in the resulting solution is less than that required to combine with the total amount of magnesium present to form a true magnesium bisulphite solution, withdrawing a part of the resulting solution, dissolving magnesium oxide in the remainder of the solution, circulating the clear solution for repeated absorption of sulphur dioxide, repeating the operation successively with the withdrawn part of the solution and gas containing higher proportions of sulphur dioxide, but not substantially exceeding a concentration of 1%, until a liquor of the desired concentration is obtained, withdrawing substantially continuously a portion of that liquor, and adding water at the initial stage to compensate for the liquor withdrawn.

5. The method of producing magnesium bisulphite liquor by absorption of sulphur dioxide from gases containing a concentration of sulphur dioxide of the order of 1%, which comprises absorbing the sulphur dioxide in a clear liquor consisting of a water solution of magnesium monosulphite in magnesium bisulphite, under conditions such that the total amount of sulphur dioxide in the resulting solution is less than that required to combine with the total amount of magnesium present to form a true magnesium bisulphite solution, withdrawing a part of the resulting solution, agitating the remainder of the solution with magnesium oxide, settling the undissolved magnesium oxide from the solution, recirculating the clear solution for repeated absorption of sulphur dioxide, repeating the operation successively with the withdrawn part of the solution and gas containing higher proportions of sulphur dioxide, but not substantially exceeding a concentration of 1%, until a liquor of the desired concentration is obtained, and finally withdrawing continuously a portion of that liquor.

6. The method of producing magnesium bisulphite liquor by absorption of sulphur dioxide from gases containing a concentration of sulphur dioxide of the order of 1%, which comprises absorbing the sulphur dioxide in a clear liquor consisting of a water solution of magnesium monosulphite in magnesium bisulphite, under conditions such that the total amount of sulphur dioxide in the resulting solution is less than that required to combine with the total amount of magnesium present to form a true magnesium bisulphite solution, withdrawing a part of the resulting solution, agitating the remainder of the solution with magnesium oxide, settling the undissolved magnesium oxide from the solution, recirculating the clear solution for repeated absorption of sulphur dioxide, repeating the operation successively with the withdrawn part of the solution and gas containing higher proportions of sulphur dioxide, but not substantially exceeding a concentration of 1%, until a liquor of the desired concentration is obtained, withdrawing substantially continuously a portion of that liquor, and adding water at the initial stage to compensate for the liquor withdrawn.

7. The method of producing magnesium bisulphite liquor by absorption of sulphur dioxide from gases containing a concentration of sulphur dioxide of the order of 1%, which comprises absorbing the sulphur dioxide in a clear liquor containing magnesium bisulphite saturated with magnesium monosulphite, under conditions such that the total amount of sulphur dioxide in the resulting solution is less than that required to combine with the total amount of magnesium present to form a true magnesium bisulphite solution, substantially continuously withdrawing a portion of the resulting liquor, delivering the remainder of the resulting liquor to a separate zone, agitating the liquor in said zone with magnesium oxide, settling undissolved magnesium oxide in said zone to give a clear supernatant liquor, returning a portion of the clear supernatant liquor to absorb further quantities of sulphur dioxide, and repeating the cycle of operation.

8. The method of producing magnesium bisulphite liquor by absorption of sulphur dioxide from gases containing a concentration of sulphur dioxide of the order of 1%, which comprises absorbing the sulphur dioxide in a clear liquor containing magnesium bisulphite saturated with magnesium monosulphite, under conditions such that the total amount of sulphur dioxide in the resulting solution is less than that required to combine with the total amount of magnesium present to form a true magnesium bisulphite solution, substantially continuously withdrawing a portion of the resulting liquor, delivering the remainder of the resulting liquor to a separate zone, agitating the liquor in said zone with magnesium oxide, settling undissolved magnesium oxide in said zone to give a clear supernatant liquor, returning a portion of the clear supernatant liquor to absorb further quantities of sulphur dioxide, repeating the cycle of operation, and adding the withdrawn liquor to a successive cycle of the same operations until a liquor of desired concentration is obtained.

9. The method of producing magnesium bisulphite liquor by absorption of sulphur dioxide from gases containing a concentration of sulphur dioxide of the order of 1%, which comprises absorbing the sulphur dioxide in a clear liquor containing magnesium bisulphite saturated with magnesium monosulphite, under conditions such that the total amount of sulphur dioxide in the resulting solution is less than that required to combine with the total amount of magnesium present to form a true magnesium bisulphite solution, substantially continuously withdrawing a portion of the resulting liquor, delivering the remainder of the resulting liquor to a separate zone, agitating the liquor in said zone with magnesium oxide, settling undissolved magnesium oxide in said zone to give a clear supernatant liquor, returning a portion of the clear supernatant liquor to absorb further quantities of sulphur dioxide, repeating the cycle of operation, and adding the withdrawn liquor to a successive cycle of the same operations in which sulphur dioxide is absorbed from gases containing a higher proportion of sulphur dioxide, but not substantially exceeding a concentration of 1%, until a liquor of desired concentration is obtained.

10. The method of producing magnesium bisulphite liquor by absorption of sulphur dioxide from gases containing a concentration of sulphur dioxide of the order of 1%, which comprises absorbing the sulphur dioxide in a clear liquor containing magnesium bisulphite saturated with magnesium monosulphite, under conditions such that the total amount of sulphur dioxide in the resulting solution is less than that required to combine with the total amount of magnesium present to form a true magnesium bisulphite solution, substantially continuously withdrawing a portion of the resulting liquor, delivering the remainder of the resulting liquor to a separate zone, agitating the liquor in said zone with magnesium oxide, settling undissolved magnesium oxide in said zone to give a clear supernatant liquor, returning a portion of the clear supernatant liquor to absorb further quantities of sulphur dioxide, repeating the cycle of operation, adding the withdrawn liquor to a successive cycle of the same operations in which sulphur dioxide is absorbed from gases containing a higher proportion of sulphur dioxide, but not substantially exceeding a concentration of 1%, until a liquor of desired concentration is obtained, and finally substantially continuously withdrawing a portion of the liquor in which sulphur dioxide was absorbed in said successive cycle.

GEORGE VICTOR PALMROSE.